No. 768,169. Patented August 23, 1904.

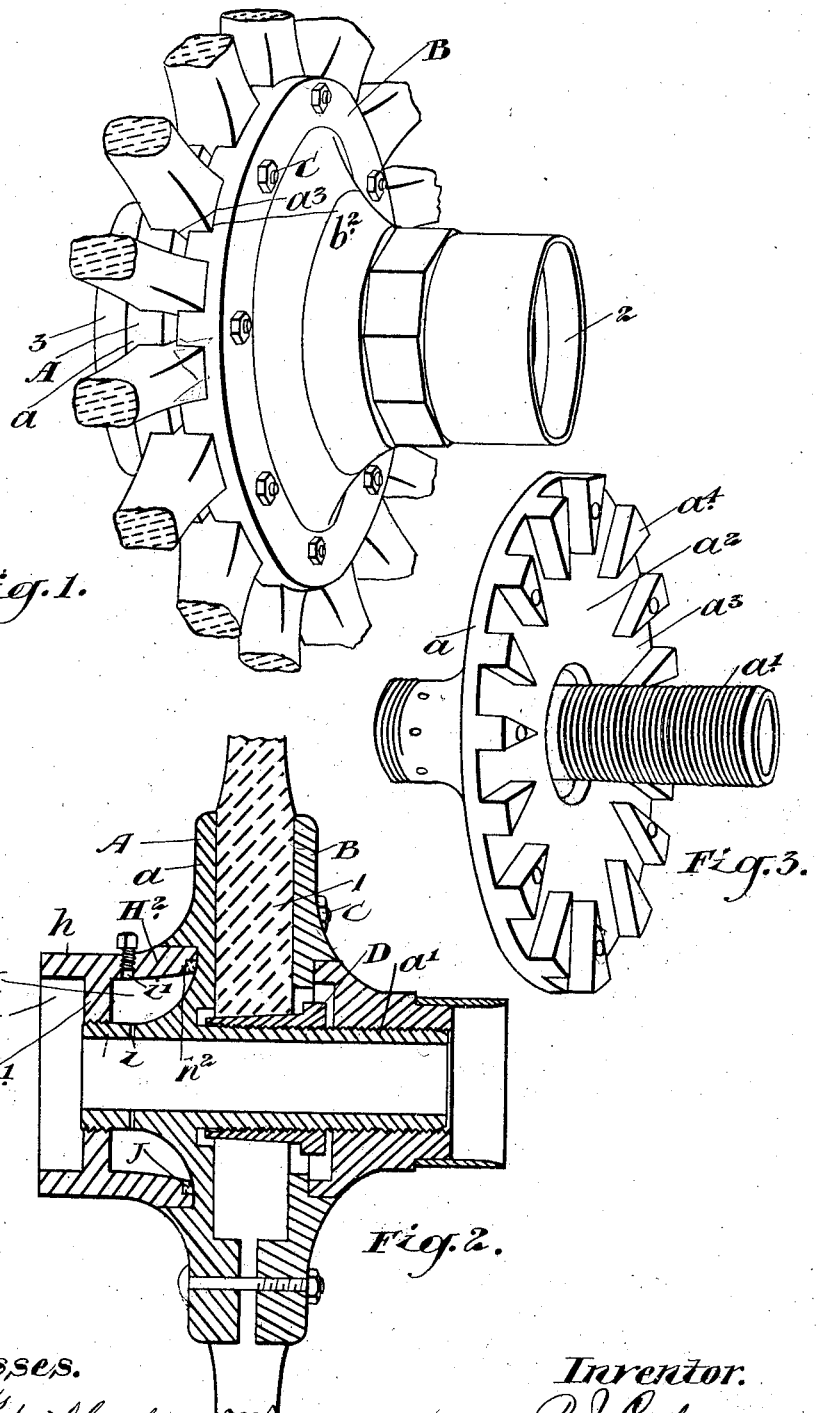

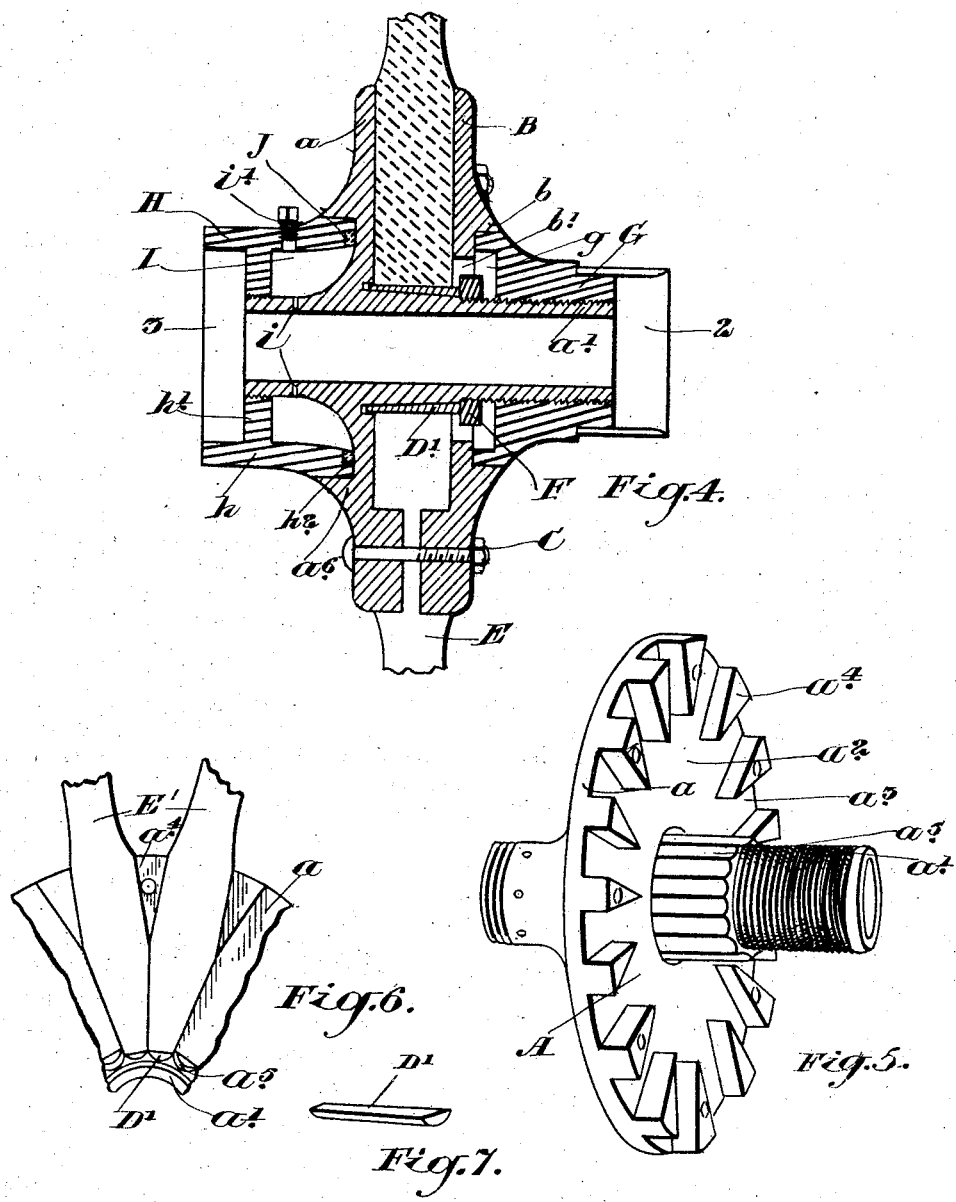

UNITED STATES PATENT OFFICE.

ROBERT JAMES CUDMORE, OF TORONTO, CANADA.

VEHICLE-WHEEL.

SPECIFICATION forming part of Letters Patent No. 768,169, dated August 23, 1904.

Application filed August 15, 1903. Serial No. 169,595. (No model.)

*To all whom it may concern:*

Be it known that I, ROBERT JAMES CUDMORE, of the city of Toronto, in the county of York, in the Province of Ontario, Canada, have invented certain new and useful Improvements in Vehicle-Wheels, of which the following is the specification.

My invention relates to improvements in vehicle-wheels; and the object of the invention is to devise a simple and efficient means for adjusting the spokes of the wheel from the hub outwardly, so as to tighten the tire on the rim of the wheel, should the spoke and rim shrink, without the necessity of removing the tire and shrinking it, further objects being to make the spokes easily replaceable and such that they may be constructed of full size where they extend into the hub, thereby adding to their strength; and it consists, essentially, of a wheel having the hub thereof formed with flanges, each being provided with corresponding radial grooves adapted to form adjustable sockets when in proximity to receive the inner ends of the spokes, a wedge being provided in contact with the inner end of each spoke and means for forcing such wedge inwardly, and thereby adjusting the spokes in an upward direction, an oil-reservoir being also included in the construction of the hub, with inlets and outlets suitably located, the various parts of the device being arranged and constructed in detail as hereinafter more particularly explained.

Figure 1 is a perspective view of the hub. Fig. 2 is a sectional view of the same, taken through the center. Fig. 3 is a perspective view of one of the flanges of the hub and the parts formed integral therewith. Fig. 4 is a similar view to Fig. 2, showing an alternative form of my device. Fig. 5 is a perspective view of one of the flanges of the hub and the parts formed integral therewith corresponding to the construction shown in Fig. 4. Fig. 6 is a detail elevation of a portion of the same through the spokes extending in toward the center of the hub and the wedges engaging the inner ends thereof. Fig. 7 is a perspective detail view of one of the wedges.

In the drawings like characters of reference indicate corresponding parts in each figure.

A is the main or body portion of the hub, and this portion consists of the circular flange $a$, formed integral with the central boxing $a'$, designed to receive the axle. The flange $a$ is formed on its surface $a^2$ with a plurality of radially-tapering grooves $a^3$, projections $a^4$ forming the side walls of the said grooves.

It may here be mentioned for the sake of clearness that 2 is the outer end and 3 the inner end of the hub.

The boxing $a'$ extends forwardly and rearwardly from the flange $a$ and adjacent to the flange $a$ and in front of the same. The outer end of the boxing is threaded.

B is a flange which corresponds with the flange $a$, formed integral with the boxing as regards the shape of its inner face, so that when the flanges are brought together the grooves $a^3$ on the flange $a$ and the grooves $b^2$ on the flange B form together sockets to receive the inner ends of the spokes, and by means of the bolts C the flange B may be rigidly secured to the flange $a$, thereby holding the spokes in position.

D is an internally-threaded tapered sleeve designed to be screwed over the threaded end of the boxing $a'$, so as to come directly in contact with the inner ends of the spokes E of the wheel.

It will now be seen that when the threaded sleeve D is screwed home the spokes are forced radially outwardly, tightening the rim on tire.

The boxing $a'$ extends in the opposite direction to the flange $a$, and a nut H is secured onto the same. The construction of this nut is as follows: The outside substantially cylindrical portion $h$ forms the body thereof, and an inwardly-extending flange $h'$ extends from the outer portion H into the boxing, upon which it is threaded. The inner edge $H^2$ of the cylindrical portion H abuts the outer face of the flange $a$, thereby forming a ring-shaped or annular space I, which is adapted to retain the oil for the bearing, the holes $i$ extending from this oil-chamber into the central hole in the axle, and an inlet-hole $i'$, with a suitable closing device, extends through the outer cylindrical portion $h$.

A washer J, which may be of any suitable material, is provided between the inner edge $h^2$ of the nut H and the face of the flange $a$ in order to prevent the oil from leaking out of the oil-chamber.

It may here be mentioned that the nut H extends into the recess formed by the projecting annular flange $a^6$, and the nut G extends into a similar recess formed by a projecting flange $b$.

In the alternative construction shown in Figs. 4, 5, 6, and 7 the outer surface of the boxing is provided with a plurality of tapered longitudinally-extending curved grooves $a^5$. The remainder of the boxing from the ends of these grooves to the outer end is threaded. D' represents wedges, one wedge being provided for each of the spokes of the wheel. These wedges are adapted to be inserted in the tapered grooves $a^5$, so as to come directly in contact with the inner ends of the spokes E' of the wheel, the curved portion of each wedge being in contact with the curved portion of the groove in which it is located. It will be seen that when all the wedges are forced into the grooves they will force the spokes outwardly, thus tightening the tire on the rim, or if one spoke should require tightening the wedge in contact with the said spoke may be forced in independently of the others. The wedges may be adjusted by tapping; but I preferably provide a nut F, which is threaded on the outside of the boxing $a'$, and its inner surface is adapted to abut against the end of the wedges, so that when it is screwed up it will force the wedges inwardly. This nut is located in the space formed by the recess $b'$ in the flange B and recess $g$ in the cap or outside nut G. It is also threaded on the outside of the boxing $a'$ and is provided with an octagonal portion adapted to be adjusted by a wrench or spanner.

Having now described the construction of my invention, I will proceed to point out its advantages, and these are, first, the extreme simplicity of the adjustment of the spokes. All that is necessary in the form shown in Figs. 1, 2, and 3 is to remove the nut or cap G from the end of the bearing-box on the threaded bearing-sleeve $a'$, when the sleeve D may be screwed up, thereby forcing the tapered portion in and simultaneously forcing the spokes out, thereby tightening the tire on the rim. In the alternative form upon the removal of the nut or cap G from the end of the bearing-box the nut F may be screwed up, thereby forcing the wedges in so as in like manner to force the spokes outwardly to tighten the tire on the rim. The oiling device, which is made possible owing to the construction of the device, is also extremely cheap. It will also be seen that a wheel in which my hub is used may be readily put together or taken apart and will be strong and cheap in construction.

What I claim as my invention is—

1. In a wheel, the spokes, a central bearing-sleeve, tapered wedging means fitting between said sleeve and the ends of the spokes, a flange bearing against the spokes, and a cap threaded on the end of the bearing-sleeve and fitting against the flange, said cap and flange forming a cover for said tapered wedging means.

2. In a wheel, a bearing-sleeve, the spokes, wedging means fitting between the inner ends of the spokes and the bearing-sleeve, said means being made up of sections independent of each other, and a nut threaded on the bearing-sleeve and bearing against the said sections.

ROBERT JAMES CUDMORE.

Witnesses:
M. McLaren,
G. S. Bate.